United States Patent [19]
Haley

[11] 3,794,435
[45] Feb. 26, 1974

[54] ADJUSTABLE HORIZONTAL HOLE DRILLING APPARATUS

[76] Inventor: Ernest K. Haley, 134 Northwestern Parkway, Louisville, Ky. 40212

[22] Filed: Apr. 12, 1973

[21] Appl. No.: 350,545

Related U.S. Application Data
[62] Division of Ser. No. 211,897, Dec. 27, 1971, Pat. No. 3,749,507.

[52] U.S. Cl. .................. 408/59, 279/20, 408/141
[51] Int. Cl. ............................................. B23b 51/06
[58] Field of Search .......... 408/141, 46, 56, 57, 59; 279/20

[56] References Cited
UNITED STATES PATENTS
| | | | |
|---|---|---|---|
| 3,127,661 | 4/1964 | McConnell | 408/46 X |
| 3,620,636 | 11/1971 | Godard | 408/141 |
| 2,977,827 | 4/1961 | Wenz | 279/20 X |
| 3,687,563 | 8/1972 | McConnell | 408/46 X |
| 3,113,329 | 12/1963 | Andres et al. | 408/141 |
| 3,024,030 | 3/1962 | Koch | 279/20 |

*Primary Examiner*—Roy Lake
*Assistant Examiner*—James F. Coan

[57] ABSTRACT

Adjustable horizontal hole drilling apparatus for simultaneous drilling of a plurality of holes in work pieces such as steel beams and the like, wherein reciprocably movable horizontally opposed heads mount drills in horizontally opposed movable relationship for operating engagement with opposite sides of the work piece, the drills being positionally vertically adjustable conjointly and severally, and wherein work piece hold down and element clamping means are provided. The apparatus is especially suited for, although not restricted to, drilling of holes in I-beam flanges.

2 Claims, 7 Drawing Figures

3,794,435

ADJUSTABLE HORIZONTAL HOLE DRILLING APPARATUS

This is a division, of application Ser. No. 211,897, filed Dec. 27, 1971, now U.S. Pat. No. 3,749,507.

BACKGROUND OF THE INVENTION

1. Field of the Invention

A major problem in the steel fabrication industry occurs in the simultaneous drilling of multiple holes in steel piece work, such as girders, I-beams, and the like. Multiple hole drilling apparatus and devices have heretofore been devised for handling I-beams and the like. Such prior known devices have been elaborate, complex and costly while at the same time requiring complex and time consuming drill bit adjusting mechanisms. Prior devices have additionally encountered difficulties in appropriately and positively clamping the work pieces being drilled and have not permitted rapid and facile positionment with respect to the work piece. Especially as applicable for horizontal drilling of holes, such prior art devices have been substantially lacking.

2. Description of the Prior Art

Prior art multiple head drilling devices are known, as shown, for example, in U.S. Pat. No. 3,501,982, issued Mar. 24, 1970, to E. K. Haley, entitled Multiple Head Drilling Apparatus which discloses apparatus vertically mounting a set of drill bits, vertically movable into operative engagement with a supported I-beam with the drive mechanism and chucks therefor being supported within a vertically reciprocable carriage. Longitudinal and transverse adjustment of the drilling bits is provided for. This known apparatus, however, does not permit vertical adjustment of the drills for varying the disposition of holes to be drilled in, for example, I-beam flanges and the known apparatus in use permits drilling holes from one side only of the work piece.

The present invention provides substantial improvements over and beyond such known apparatus.

CROSS REFERENCE TO RELATED APPLICATION

Multiple Hole Drilling Apparatus, application Ser. No. 210,381, filed Dec. 21, 1971, inventor Ernest K. Haley.

SUMMARY OF THE INVENTION

According to the present invention, apparatus is provided for the drilling of multiple holes from laterally opposed opposite sides of a work piece, such as the respective flanges of I-beams. The drills are adjustably mounted horizontally in reciprocably movable horizontally opposed heads. The drills are positionally vertically adjustable conjointly and severally to permit adjustment of vertical adjustable positionment of drilling in the work piece and vertical adjustment between drills in a set on the head on each side of a work piece for varying the drilling gauge between the drills. Suitable work piece hold down and clamping means are incorporated and the overall structure is highly efficient in its use and operation.

Additional objects and advantages of the invention will become more readily apparent from the following detailed description of an embodiment thereof when taken together with the accompanying drawings in which:

FIG. 5 is an end elevational view of one end of the apparatus of FIG. 1;

Figure 1:
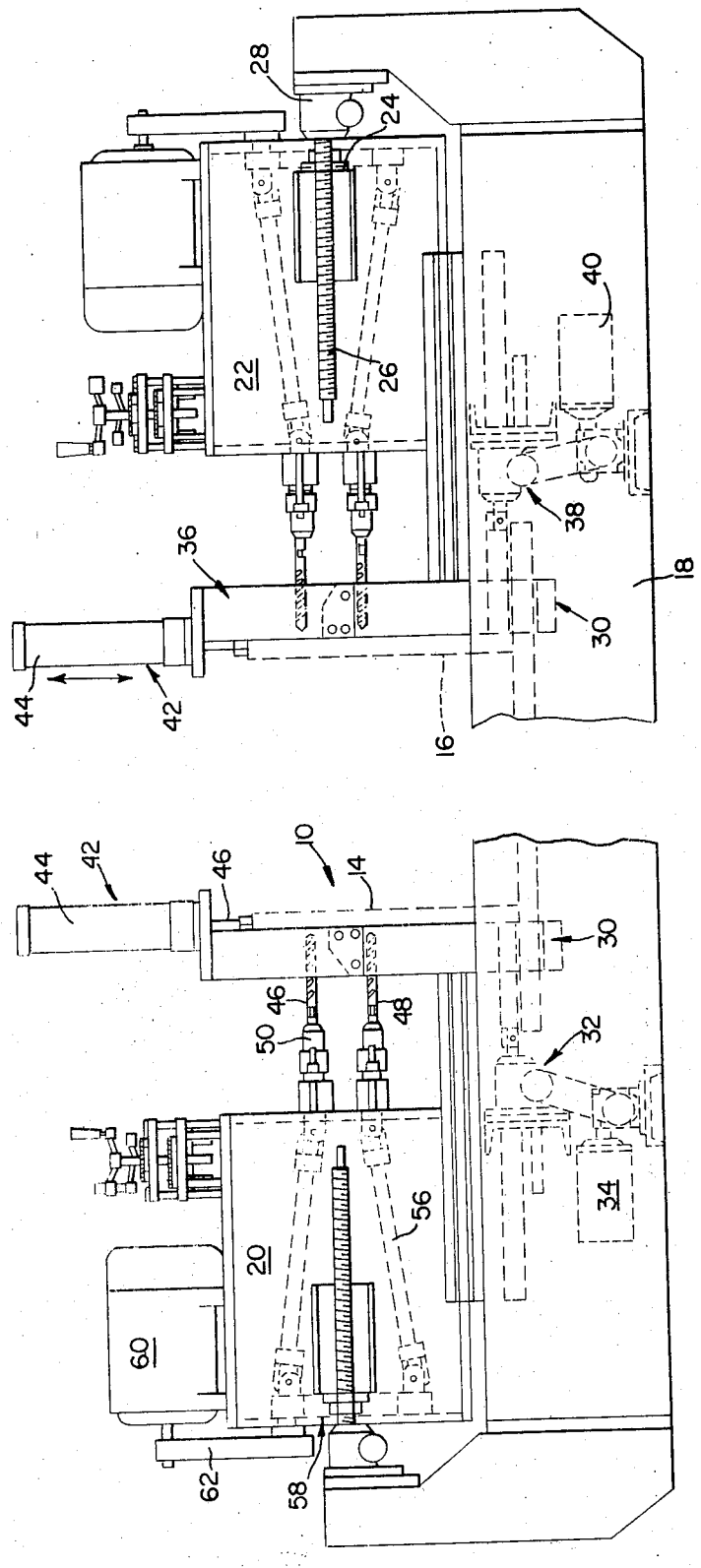
FIG. 1 is a side elevational view, parts being broken away, of apparatus according to the invention.
Figure 2:
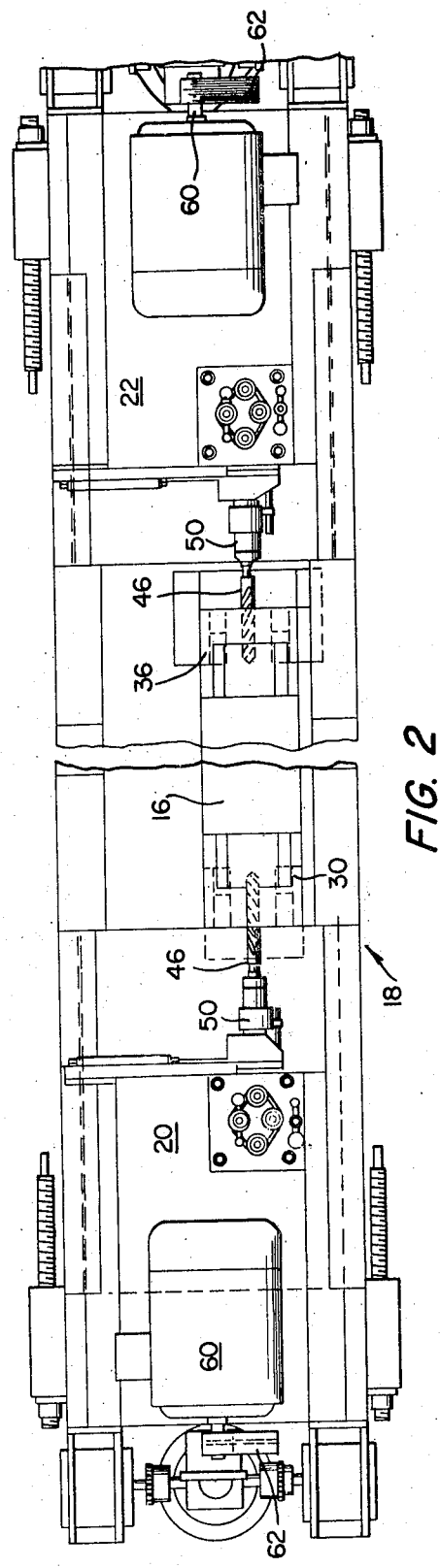
FIG. 2 is a top plan view of the apparatus of FIG. 1.

Referring now in more detail to the drawings, an I-beam generally designated 10 or other work piece to be drilled, including web 12 and flanges 14 is appropriately supported by support means generally indicated at 16 in a broken line on a base or support for the device designated 18. A semi-fixed head 20 and a moving or movable head 22 are movably supported on base 18 and adapted for movement toward and away from one another. The semi-fixed head is movable to feed in and out for drilling in relation to two fixed positions, preferably, and for example, a back gauge position of 24 inches or less and a back gauge position between 36 inches and 24 inches. The moving or movable head 22 feeds in and out for drilling in relation to the various beam sizes run through the apparatus. The normal starting point being plus or minus one-fourth inch from point of drill to face of flange. The semi-fixed head after proper positionment is secured. The moving head 22 is adjustable through a traveling nut or the like 24 operatively secured to the head coacting with a threaded bolt 26 operatively driven from a mechanical jack drive 28, hydraulic cylinder, etc. A back gauge clamp 30, shown in FIG. 1 in full lines in a rear position constitutes a semi-fixed clamp in operative association with the semi-fixed head 20. The semi-fixed clamp and semi-fixed head are movable through a clamping drive generally designated 32 and associated clamping drive motor 34 to engage the outer end of a work piece, such as an I-beam flange, to be drilled.

A moving clamp and/or back gauge 36 is adapted for positionment and work piece engagement by a similar clamping drive 38 and clamping drive motor 40. Hold down clamps generally designated 42 which can be hydraulic, air or otherwise include, for example, hold down cylinders 44 with rods 46 operatively engaging the uppermost surface of the work piece such as the I-beam flange 14 as shown in FIG. 1. The foregoing structure is for support and positionment of different size work pieces and as shown to support I-beams of different sizes in position to drill holes through the flanges thereof in adjusted variable positions therethrough. A common web support plane is provided common to all beams as schematically shown.

Operably mounted and associated with each of the heads 20, 22 are upper and lower drills 46, 48 respectively mounted in chucks 50 and which in turn are mounted or carried by upper and lower plates 52, 54 adjustably mounted with respect to the heads. The mounts and adjusting mechanisms are similar for each of the heads and drills carried thereby and will be described hereinafter in greater detail. The individual drills are driven from universal joint drive shafts 56 through a drive train generally designated 58 which can be a silent chain, gearing or the like, drill drive motor 60 and chain or the like 62. These drives for the drills can be similar to those shown in my aforesaid U.S. Pat. No. 3,501,982.

Figure 3:
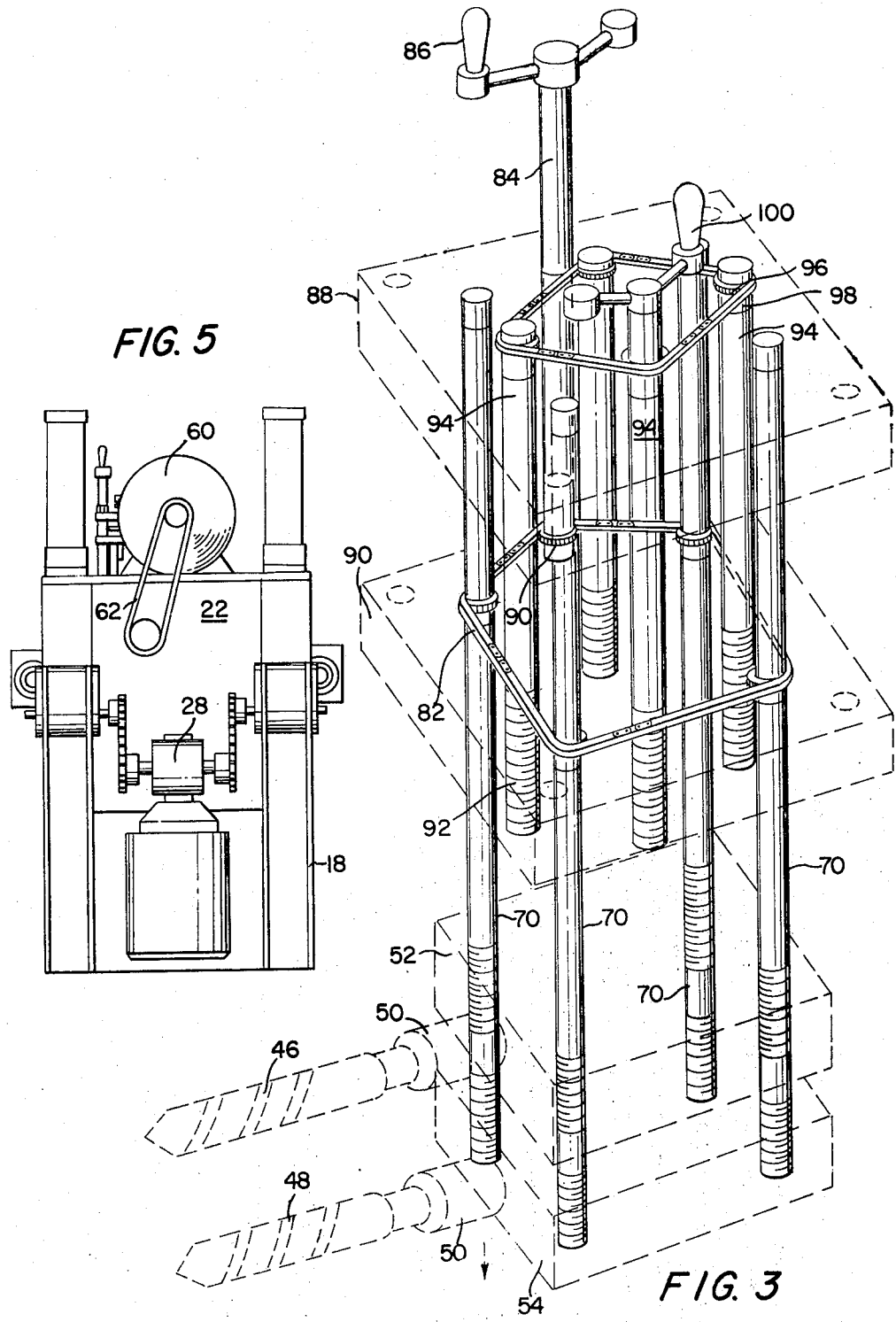
FIG. 3 is a perspective view of drill vertical adjustment mechanism.
Figure 4:
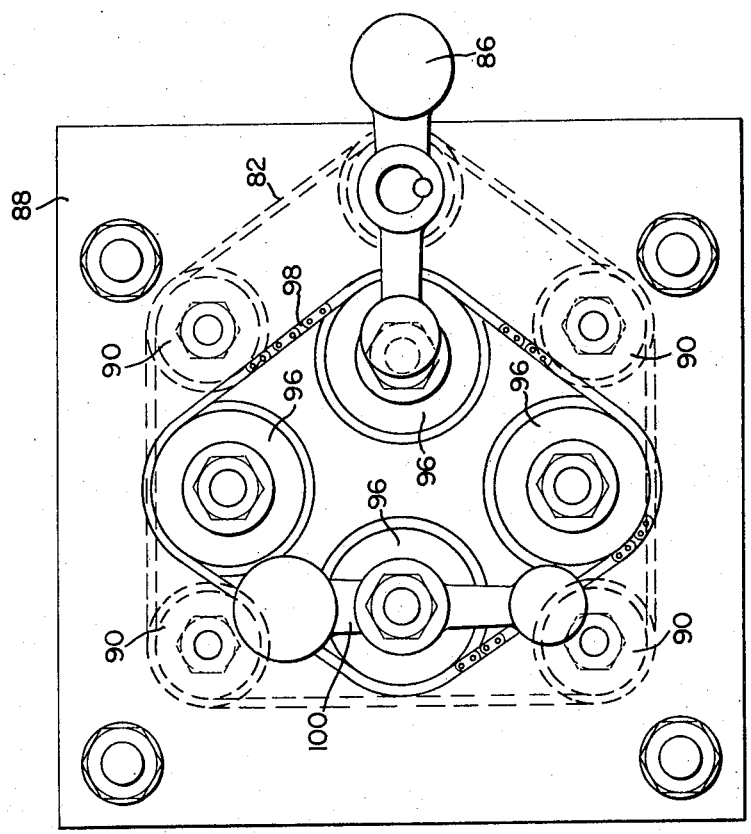
FIG. 4 is a plan view of the adjustment mechanism of FIG. 3.
Figure 6:
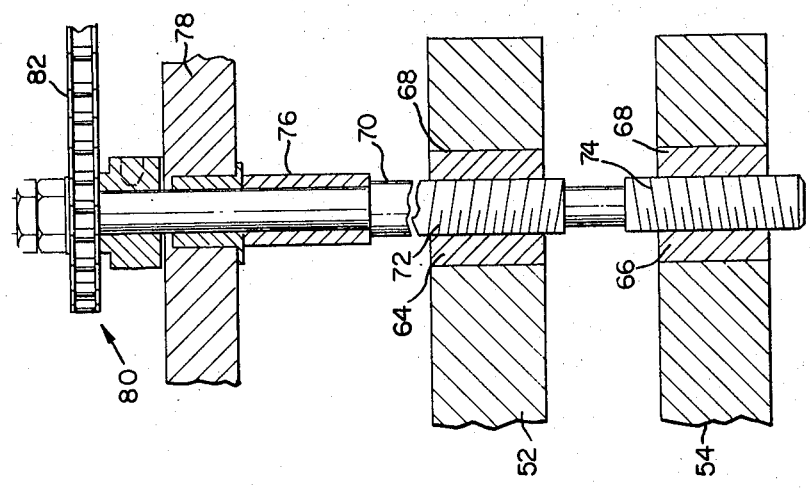
FIG. 6 is a fragmentary vertical sectional view of a portion of the vertical adjusting means shown in FIG. 3.

The apparatus of the present invention, as set forth hereinbefore, provides for adjustment of the drilling position of the drills vertically with respect to a work piece to be drilled. To this end means are provided for a gang adjustment of the drills on each side of the work piece, or in other words in each head to adjust conjointly the two drill bits mounted thereon. Additional means are provided for the drills on each head for a gage adjustment to vary the distance between the drills. This mechanism will be readily understood by reference to FIGS. 3, 4 and 5 of the drawings. The upper and lower plate 52, 54 in effect constitute spindle blocks which carry or mount the upper and lower drill bits 46, 48. As shown in FIG. 6, these spindle blocks have operatively associated therewith threaded nuts, the upper threaded nut 64 having right hand threads and the lower threaded nut 66 having left hand threads. The nuts are prevented from rotation by means of keys 68. A shaft 70 having a right hand threaded portion 72 and a left hand threaded portion 74 operatively engages in nuts 64, 66. The shaft extends, at its upper portion through bushing 76 operatively associated with lifting and lowering plate 78. A connecting chain and sprocket generally indicated at 80 are attached to the upper end of shaft 70. As seen from FIG. 3, four of the shafts 70 are so arranged with respect to the spindle blocks as to permit adjustment therebetween in a stable parallel movement. This movement to separate the spindle blocks and/or to more closely proximate the same is effected through the coacting left and right hand threads. The control or operating mechanism includes a common chain 82 in the connecting chain and sprocket arrangement 80. An operating shaft 84 having a crank 86 at its upper end is rotatably mounted in a support plate 88 which is in a fixed position and the lower end of shaft 84 has a sprocket 90 which engages with chain 82. Upon rotation of shaft 84 through crank 86 the shafts 70 are rotated either clockwise or counter clockwise and function to vary the distance between spindle blocks 52, 54 and thereby relatively space drill bits 46 and 48. This adjustment for relative spacing between the drill bits accommodates the apparatus not only to different dimensioned work pieces but permits varying for any given work piece the vertical distance between holes drilled therein.

The apparatus also includes gang adjustment means for conjointly raising and lowering the drill bits 46, 48 independently of the gage adjustment therebetween. This includes a center line adjustment lifting/lowering plate 90 in which are threadedly engaged lower threaded ends 92 of a plurality of rods 94 having at their upper end sprockets 96 commonly engaged with chain 98. A crank or the like 100 is attached to one of the rods 94 and upon rotation thereof will serve to raise or lower plate 90 and together therewith conjointly the spindle blocks 52, 54 and drill bits 46, 48 carried thereby. This latter adjustment, which is for a gang adjustment of the drilling position in conjunction with the gage adjustment permits great flexibility with respect to the holes to be drilled in work pieces as will be apparent.

Figure 7:
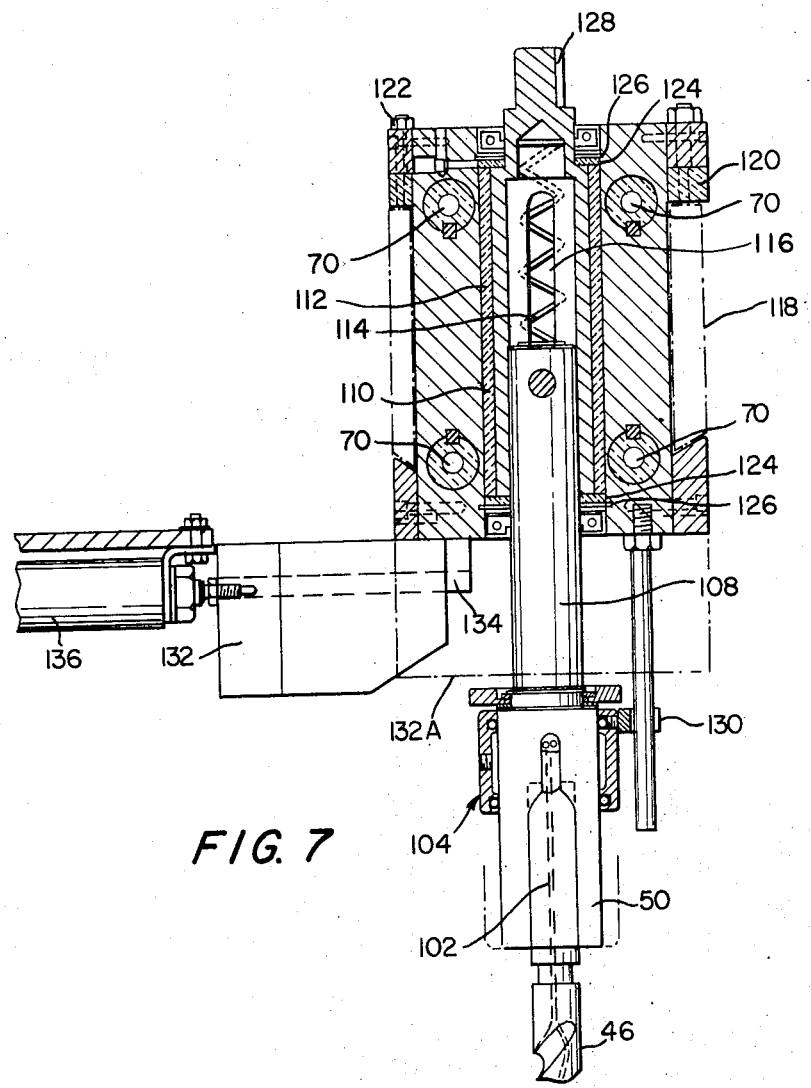
FIG. 7 is a sectional view through a head showing the adjustment means for the drills and drill mount, including drill position locking means.

Mounting and operating structure for the drill bits and structural details thereof will be understood from FIG. 7 of the drawings. The drill bits 46 are of an oil hole drill type having a coolant passage 102 operatively associated through a coolant or water jacket or sleeve 104, through port 106 with an appropriate coolant source. Chuck 50 is appropriately mounted on floating spindle 108 which is slidably mounted in a fixed spindle sleeve 110 in sleeve bearing 112. A compression spring 114 engages between fixed spindle 110 and floating spindle 108. A slot 116 is provided in fixed spindle 110 for continuous power transmission when the floating spindle is extended or retracted and the mounting apparatus includes interengaging dovetailed bars 118 and gib blocks 120 which are adjustable by gib adjustment screws 122. Thrust washers 124 and clip rings 126 are associated with the fixed sleeve and sleeve bearing at opposite ends. The fixed spindle 110 is driven at end 128 through drive shaft 56. An anti-rotation rod and finger generally indicated at 130 are associated with the mounting head and coolant jacket. A locking block shown in full lines at 132 in a retracted or non-drilling position is mounted on block guides 134 and operable by a hydraulic cylinder, solenoid or the like 136. The extended or drilling position is indicated at 132A in dotted lines.

From the foregoing it will be readily understood that the apparatus of the present invention provides for adjustable horizontal hole drilling for simultaneous drilling of a plurality of holes in work pieces with reciprocably movable horizontally opposed heads mounting drills in horizontally opposed movable relationship for operating engagement with opposite sides of the work piece. The drills are vertically positionally adjustable both conjointly and severally and work piece hold down and element clamping means are provided. The apparatus is highly efficient in operation and yet has simplicity of construction.

Manifestly, minor changes in the details of the construction can be effected in the shown and described embodiment without departing from the spirit and scope of the invention as defined in and limited solely by the appended claims.

I claim:

1. An adjustable horizontal hole drilling apparatus for simultaneous drilling of a plurality of holes through vertically disposed workpiece areas, comprising:
   A. reciprocably movable horizontally opposed drill bit mounting heads, including in said heads:
      i. a fixed sleeve bearing;
      ii. a fixed spindle in said bearing rotatably disposed therein;
      iii. a floating spindle slidably mounted in said fixed spindle operatively fixed with respect thereto; and
      iv. drive means for rotating said fixed spindle and therethrough said floating spindle;
   B. chucks attached to said floating spindles;
   C. vertically spaced drill bits operatively mounted in horizontal drilling positions in said chucks on said floating spindles;
   D. means for horizontally extending and retracting said drill bits on each said head into and out of operative drilling engagement with a workpiece being drilled;
   E. said drive means including:

i. a compression spring interposed between said fixed spindle and said floating spindle;
ii. said fixed spindle having a slot therein; and
iii. a power transmission pin interengaging said floating spindle and said slot for continuous power transmission when said floating spindle is extended or retracted with respect to said fixed spindle;

F. means for positionally vertically adjusting said drill bits on the respective ones of said heads conjointly and severally to vertically adjusted drilling positions with respect to a workpiece to be drilled and to adjusted spaced drilling positions with respect to one another and to a said workpiece; and G. a locking block mounted for extension and retraction into operative engagement with said chucks to selectively lock said drill bits in extended drilling position and permit retraction therefrom.

2. An adjustable horizontal hole drilling apparatus as claimed in claim 1, said drill bits having a coolant passage therethrough, a coolant water jacket operatively associated with said chuck, a coolant passage in said jacket adapted for connection to a coolant source, said coolant passage in said drill bit being operatively associated with said coolant jacket for supply of the coolant to said drill bit coolant passage.

* * * * *